US008611691B2

(12) United States Patent
Vorontsov et al.

(10) Patent No.: US 8,611,691 B2
(45) Date of Patent: Dec. 17, 2013

(54) AUTOMATED VIDEO DATA FUSION METHOD

(75) Inventors: Mikhail A. Vorontsov, Laurel, MD (US); Gary W. Carhart, Elkton, MD (US); Mathieu Aubailly, Washington, DC (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 621 days.

(21) Appl. No.: 12/836,988

(22) Filed: Jul. 15, 2010

(65) Prior Publication Data

US 2011/0025919 A1 Feb. 3, 2011

Related U.S. Application Data

(60) Provisional application No. 61/230,240, filed on Jul. 31, 2009.

(51) Int. Cl.
*G06K 9/40* (2006.01)
(52) U.S. Cl.
USPC ............ 382/275; 348/607; 386/264; 386/269
(58) Field of Classification Search
USPC .................... 382/275; 348/607; 386/264, 269
See application file for complete search history.

(56) References Cited

PUBLICATIONS

Mikhail A. Vorontsov and Gary W. Carhart, Anisoplanatic imaging through turbulent media: image recovery by local information fusion from a set of short-exposure images, J. Opt. Soc. Am. A/ vol. 18, No. 6/Jun. 2001.*

Gary W. Carhart and Mikhail A. Vorontsov, Synthetic imaging: nonadaptive anisoplanatic image correction in atmospheric turbulence, May 15, 1998 / vol. 23, No. 10 / Optics Letters.*
Mathieu Aubailly, Mikhail A. Vorontsov, Gary W. Carhart, Michael T. Valley, Automated video enhancement from a stream of atmosphericallydistorted images: the lucky-region fusion approachSPIE Aug. 2, 2009.*

* cited by examiner

*Primary Examiner* — Chan Park
*Assistant Examiner* — Mark Roz
(74) *Attorney, Agent, or Firm* — Alan I. Kalb

(57) ABSTRACT

A method for mitigating image distortions induced by optical wave propagation through a random media (e.g., atmospheric turbulence or volume of water) from a stream of video data provided by a single shortexposure image sensor is described. The method is based on the two following sequential steps: (1) enhancement of the raw video stream and (2) fusion of the enhanced stream using the lucky region fusion (LRF) technique. The first step enhances features of the raw image stream the LRF method success is based on and especially mitigates the effect of low light level, aerosol pollution, dust, haze, and other deteriorating factors. The second step, fusion of the enhanced stream, is realized by sequentially merging image regions with highest quality within a temporal buffer into a single image before sliding the temporal window forward. The process is continuously repeated in order to generate a stream of fused images. The resulting fused stream hence has an image quality superior to that of any image within the buffer and demonstrates improved contrast as well as increased detail visualization. In addition, the disclosed invention offers a method for automated extraction of random media (atmospheric turbulence for example) characteristics needed for optimizing the LRF method performance. Based solely on analysis of the enhanced video stream, this has the advantage to eliminate the need for turbulence strength characterization devices (e.g., scintillometer) and it allows the invention to provide an optimal fused stream even when operating within an evolving environment.

4 Claims, 3 Drawing Sheets

AUTOMATED VIDEO DATA FUSION METHOD

CROSS-REFERENCE TO RELATED APPLICATIONS

Figure 1:
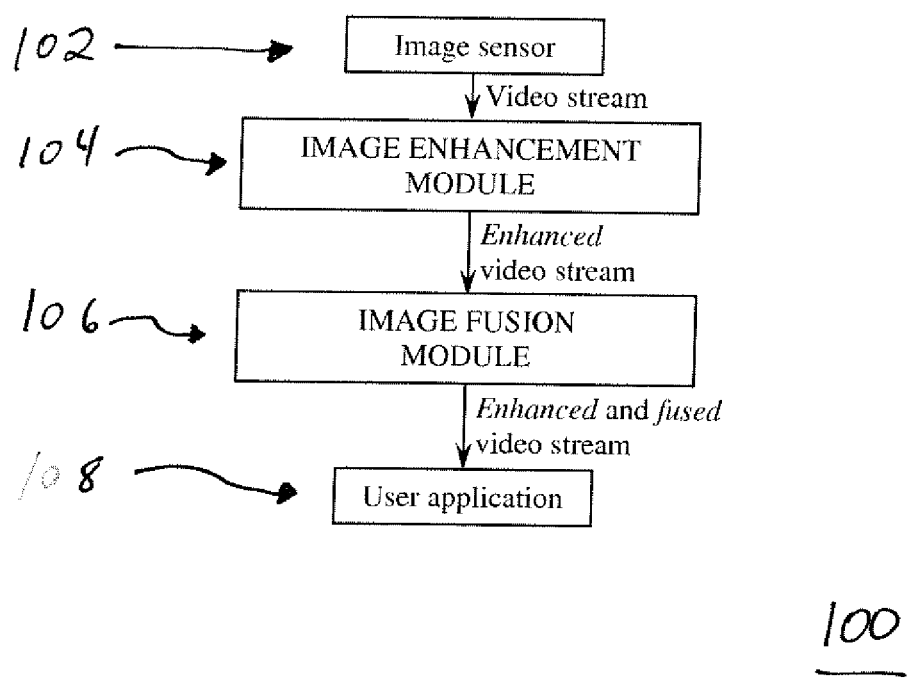

This application depends from a provisional U.S. patent application entitled "AUTOMATED VIDEO DATA FUSION METHOD" (application No. 61/230,240), filed on Jul. 31, 2009, the contents of which, in its entirety, is herein incorporated by reference.

GOVERNMENT INTEREST

The embodiments described herein may be manufactured, used, and/or licensed by or for the United States Government without the payments of royalties thereon.

The invention relates to the field of optical imaging, in particular to methods and systems aiming to mitigate image distortions within a video data stream.

BACKGROUND

Imaging through a random media such as the atmosphere or a volume of water results in images that are deteriorated for two different reasons: (1) optical wave propagation through a turbulent media induces wavefront aberrations that cause images to be distorted randomly and restrain imaging systems from achieving diffraction-limited performance, and (2) imaging conditions such as low light level, haze, dust, aerosol pollution, etc. usually result in images that are noisy, with reduced contrast and visibility. The combination of both deteriorating factors causes severe performance limitations to imaging systems operating in such conditions.

Over time, a number of techniques had been used to compensate for turbulence-induced aberrations. Among electro-mechanical solutions to the problem, the most significant is conventional adaptive optics (AO) [U.S. Pat. Nos. 5,046,824; 5,026,977; 5,684,545], a technique developed originally for astronomical observations. Conventional AO successfully achieves near-diffraction-limited imaging, but suffers from anisoplanatism which restricts the correctable field-of-view (FOV) to small angular extents. Though multiple-guide-star AO and multi-conjugate AO systems [U.S. Pat. No. 6,452,146] attempted to extend the FOV, it angular extent is still limited to value typically in the order of $\frac{1}{10}$th degree.

Based on a different approach, a number of digital processing techniques had been developed and demonstrated image quality improvements in the case of weak anisoplanatism conditions (narrow FOV) but generally fail otherwise. Techniques based on block-processing (or mosaic processing) can reconstruct images over anisoplanatic FOV's but usually require the knowledge of the point spread function (PSF) which is unavailable in most applications. Another approach, referred to as "lucky" imaging, consists in selecting best quality frames from a stream of short-exposure images using an image quality metric. The problem with that approach is the low probability of appearance of a good quality image under anisoplanatic conditions.

Techniques referred to as synthetic imaging or lucky-region fusion (LRF) which overcome most shortfalls of techniques previously mentioned and compensates turbulence-induced distortions while succeeding under anisoplanatic conditions had been developed. In fact, the LRF method has essentially no limitation to its effective FOV and performs successfully over angular extents hundreds of times larger than the isoplanatic angle. The techniques consist in fusing best quality regions within a stream of short-exposure images based on their local image quality. It owes its robustness during operation under anisoplanatic conditions to the use of a tool which characterizes locally the quality of an image: an image quality map (IQM).

Though a number of other fusion techniques exist, they do not aim to mitigate random image distortions U.S. Pat. Nos. 4,661,986; 5,140,416; 5,325,449; 5,881,163; 6,201,899; 6,320,979; 6,898,331; 7,176,963. Additionally, they typically require either two or more image sensors either special hardware such as moving lenses or moving sensor for example. On the contrary, the LRF technique successfully mitigates random image distortions and has the advantage to require only one image sensor to collect a stream of randomly-distorted images.

The downfall of most image processing techniques is to operate directly on the raw data stream collected by the image sensor(s) and their performance therefore depends strongly on the imaging conditions such as the light level, aerosol pollution, dust, haze, and other deteriorating factors.

The present invention includes a step prior to applying the LRF algorithm specifically designed for enhancing image quality in the raw data stream that are most critical to a successful fusion. It especially mitigates the effect of low light level, dust, haze, aerosol pollution, and other deteriorating factors.

SUMMARY

This invention satisfies the above needs. A novel method for mitigating image distortions induced by optical wave propagation through a random media (e.g., atmospheric turbulence or volume of water) from a stream of video data provided by a single shortexposure image sensor is described herein. The method is based on the two following sequential steps: (1) enhancement of the raw video stream and (2) fusion of the enhanced stream using the lucky region fusion (LRF) technique. The first step enhances features of the raw image stream the LRF method success is based on and especially mitigates the effect of low light level, aerosol pollution, dust, haze, and other deteriorating factors. The second step, fusion of the enhanced stream, is realized by sequentially merging image regions with highest quality within a temporal buffer into a single image before sliding the temporal window forward.

The process is continuously repeated in order to generate a stream of fused images. The resulting fused stream hence has an image quality superior to that of any image within the buffer and demonstrates improved contrast as well as increased detail visualization. In addition, the disclosed invention offers a method for automated extraction of random media (atmospheric turbulence for example) characteristics needed for optimizing the LRF method performance. Based solely on analysis of the enhanced video stream, this has the advantage to eliminate the need for turbulence strength characterization devices (e.g., scintillometer) and it allows the invention to provide an optimal fused stream even when operating within an evolving environment.

DRAWINGS

Figure 2:
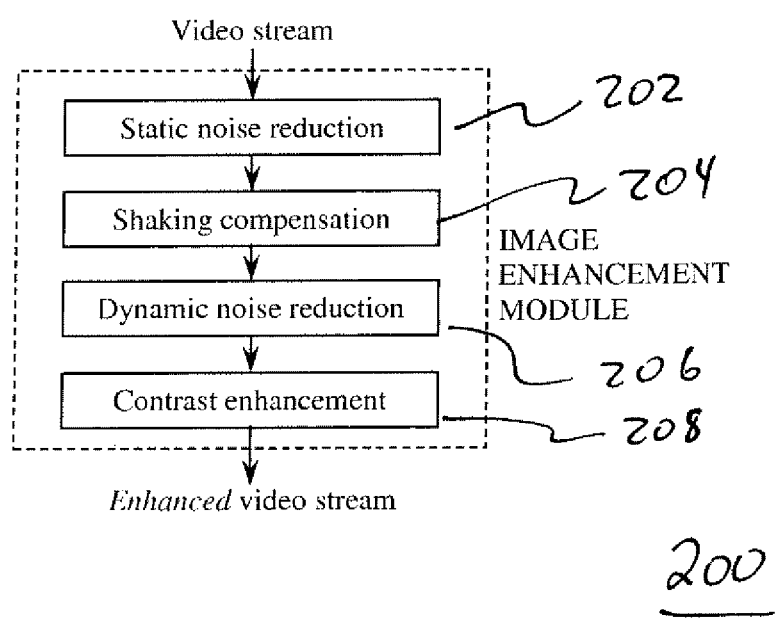
Figure 3:
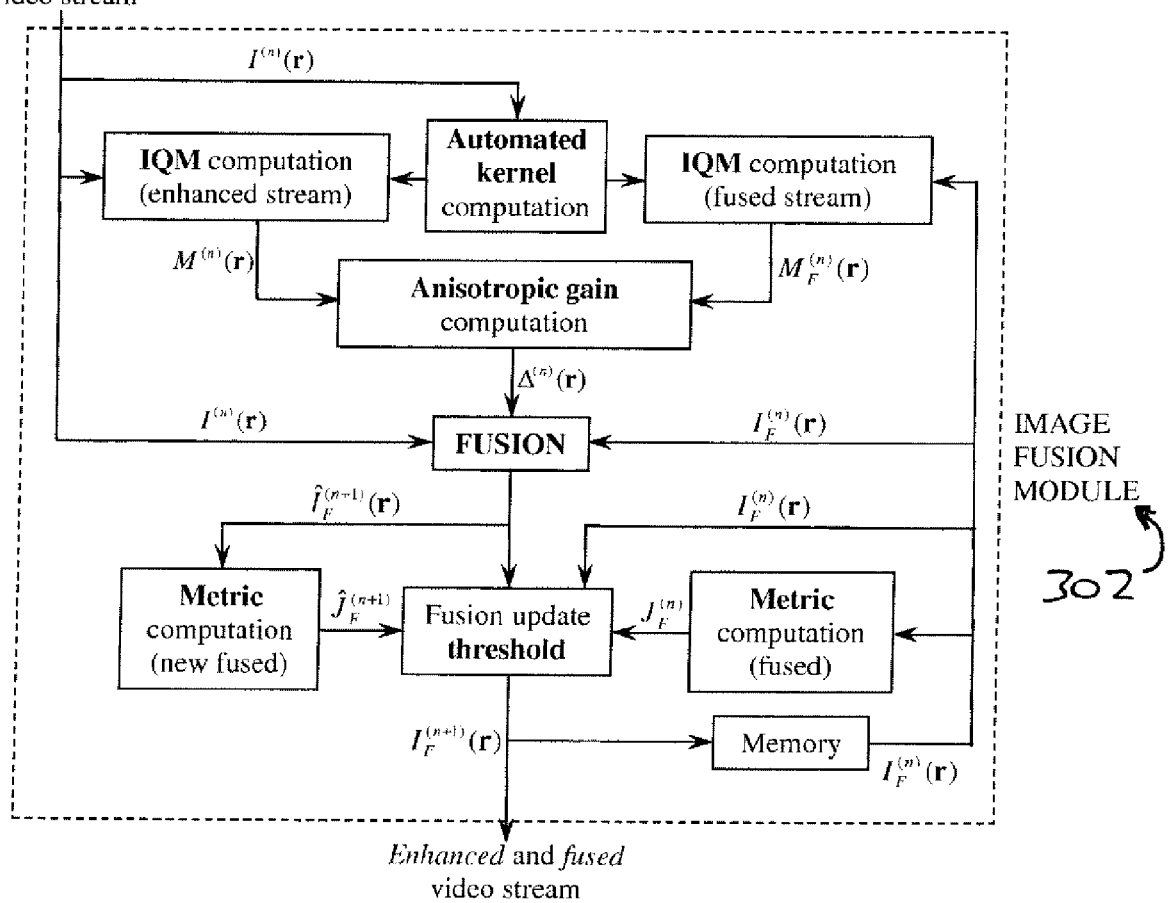

These and other features, aspects and advantages of the present invention will become better understood with reference to the following description, appended claim and accompanying drawings where FIG. 1 is a block diagram of the video stream processing method showing the two major computational steps: (1) image enhancement and (2) image fusion, FIG. 2 is a block diagram of the image enhancement module showing the sequential steps for the compensation of specific image artifacts, and, FIG. 3 is block diagram depicting the computational steps of the fusion process.

DESCRIPTION

FIG. 1 shows the computational steps of the video stream processing technique. The technique requires an image sensor which provides a stream of short-exposure images of a stationary scene. The sensor video stream is then (1) digitally enhanced using the "Image Enhancement Module" and (2) digitally fused using the "Image Fusion Module".

The image enhancement module aims to mitigate the effect of factors such as dust or scratches on the optics of the imaging system, dead camera pixels, unstable system mount, low light level, haze, aerosol pollution, etc. FIG. 2 shows a block diagram of the module and its different computational steps.

FIG. 2 is a Block diagram of the image enhancement module showing the sequential steps for the compensation of specific image artifacts, these artifacts include but are not limited to:

Static noise reduction: Dust and scratches present on the optics of the imaging system or dysfunctional camera pixels (dead pixels) constitute spatially-invariant image degradations which are nearly independent of the observed scene. Such a static noise is conveniently detected and mitigated prior any alteration to the image stream. For this reason, the "Static noise reduction" step (see FIG. 2) is performed first in the sequence of image enhancement steps. A conventional approach for mitigating static noise consists in subtracting a background image from each image of the stream.

Shaking/jitter compensation: Random turbulence along the imaging path induces wavefront aberrations to the optical wave. The most significant contribution to the aberrations consists in the ones of first order, so called tip/tilt aberrations. Such aberrations are observed in the incoming image stream as spatial translations of the image (jitter). An unstable imaging system mount also contributes to random translations of the image stream. The "Shaking compensation" step in FIG. 2 aims to mitigate such image translations and improve the stream stability. An approach consists in considering a reference image (e.g., an average image computed from several frames) and translating each image based on the position of the correlation function's peak with respect to the can be used.

Dynamic noise reduction: Poor imaging conditions such as a low light level cause the stream of images to be noisy (shot noise). Characteristics of the image sensor (camera detector sensitivity, camera array size, etc.) also influence the noise level in the image. Such types of noises are dependent on the scene of interest. The "Dynamic noise reduction" step in the Image Enhancement Module in FIG. 2 aims to reduce the noise level in the image stream. A number of techniques exist to achieve dynamic noise reduction. A simple one consists in applying a lowpass spatial filter to each image of the stream.

Contrast enhancement: Aerosol pollution, haze, rain are few of the factors contributing to low contrast and visibility in the stream of images. The "Contrast enhancement" step in FIG. 2 seeks to improve the contrast of image and emphasize details that will be useful to the subsequent image fusion algorithm. A diversity of contrast enhancement techniques exists, which alter images either globally or locally. Common techniques include histogram stretching (applied globally or line-byline), unsharp masking, image sharpening, differential hysteresis processing [U.S. Pat. No. 5,563,962], gray level grouping (GLG), etc.

Image Fusion Module The image fusion module performs a fusion of the enhanced stream images into a stream of fused images with improved image quality. The computational steps of the fusion process are shown in FIG. 3.

"IQM computation" blocks: The quality of the image streams $I^{(n)}(r)$ (enhanced stream) and $I_F^{(n)}(r)$ (fused stream) is characterized locally by mean of the IQM's $M^{(n)}(r)$ and $M_F^{(n)}(r)$ respectively where the vector $r=\{x,y\}$ denotes the spatial coordinates and n the index of the image in the stream. The IQM's are computed by convolution of an image quality function $J(r)$ (i.e. edge-detection operator, contrast operator, Tenengrad criterion, intensity-squared metric, etc.) with a kernel. The IQM is given by $$M(r)=\int J(r')G(r-r',a)d^2r',$$

where $G(r,a)$ is kernel with size a. For example the kernel can be chosen to have a Gaussian distribution: $G(r,a)=\exp[-(x^2+y)/a^2]$.

Note: Instead of computing IQM's based on a single image quality function $J(r)$, a combination of several image quality functions can be used. This allows taking into account different features in an image (i.e. edges, contrast, etc.). For example this can be achieved through the following linear combination:

$$M^{(n)}(r) = \sum_i \beta_i [M_i^{(n)}(r)]^{\gamma_i},$$

where $\{M_i^{(n)}(r)\}$ is a set IQM's obtained using different image quality functions $J_i(r)$ referred to with index i, and $\beta i$ and $\gamma i$ are weighting and power coefficients, respectively.

"Anisotropic gain computation" block: This function block performs a comparison of the image quality at the local level between the enhanced stream and the fused stream and allows for the selection of best image quality regions (the "lucky" regions). The selection of such areas is characterized by the function denoted $\Delta^{(n)}(r)$ and referred to as anisotropic gain. A example of definition for the anisotropic gain is given by $$\Delta^{(n)}(r) = \begin{cases} \dfrac{M^{(n)}(r) - M_F^{(n)}(r)}{\max[M^{(n)}(r) - M_F^{(n)}(r)]} & \text{for } M^{(n)}(r) > M_F^{(n)}(r) \\ 0 & \text{for } M^{(n)}(r) \le M_F^{(n)}(r). \end{cases}$$

Another example of definition is given by $$\Delta^{(n)}(r) = \begin{cases} \dfrac{M^{(n)}(r) - k_1 M_F^{(n)}(r)}{(k_2 - k_1) M_F^{(n)}(r)} & \text{for } k_1 \le \dfrac{M^{(n)}(r)}{M_F^{(n)}(r)} < k_2 \\ 0 & \text{for } \dfrac{M^{(n)}(r)}{M_F^{(n)}(r)} < k_1 \\ 1 & \text{for } \dfrac{M^{(n)}(r)}{M_F^{(n)}(r)} \ge k_2. \end{cases}$$

Regions of $\Delta^{(n)}(r)$ with a non-zero value correspond to regions of the enhanced stream fused into the stream $\hat{I}_F^{(n)}(r)$.

"FUSION" block: The fusion of the "lucky" regions into the fused stream $\hat{I}_F^{(n)}(r)$ is performed for the $n^{th}$ image according to the following fusion equation:

$$\hat{I}_F^{(n+1)}(r) = [1-\Delta^{(n)}(r)] I_F^{(n)}(r) + \Delta^{(n)}(r) I^{(n)}(r).$$

"Metric computation" blocks: Global image quality metrics $\hat{J}_F^{(n+1)}$ and $J_F^{(n)}$ are obtained by computing an image quality function and integrating it over the entire image: $\hat{J}_F^{(n+1)} = \int \hat{J}_F^{(n+1)}(r) dr$ and $J_F^{(n)} = \int J_F^{(n)}(r) dr$. The metrics characterize globally the image quality.

The metrics characterize globally the image quality.

"Fusion update threshold" block: This block updates the fused image stream $I_F^{(n+1)}(r)$ according to the rule:

$$I_F^{(n+1)}(r) = \begin{cases} \hat{I}_F^{(n)}(r) & \text{if } \hat{J}^{(n)} > \alpha \cdot J^{(n)} \\ I_F^{(n)}(r) & \text{otherwise,} \end{cases}$$

Where $\acute{\alpha}$ is a threshold coefficient. If $\acute{\alpha}=1$, the fused stream is updated with the new fused image at index n+1 only if its global image quality is strictly superior to that on the previous iteration.

"Automated Kernel Computation" Block

The selection of the fusion kernel size a [see Eq. (1)] is performed automatically from the analysis of the incoming stream of images, specifically the edge content of images. The automation approach consists in (1) Computing an edge metric $\Gamma$ which characterizes the edge content of the image stream $I^{(n)}(r)$, and (2) calculating the automated fusion kernel size a from metric $\Gamma$ fusing a model.

Edge metric The computation of the edge metric $\Gamma$ for the set of source images $I^{(n)}(r)$ is performed according to the following steps:

Step 1: edge map computation The average image $\check{I}(r)$ yielded by the incoming stream $I^{(n)}(r)$ is used to compute an edge map given as $\gamma(r) = \Delta[\check{I}(r)]$.

Step 2: computation of edge metric $\Gamma$ assuming the edge map $\gamma(r)$ has a total number of pixels $N_{pix}$, the edge metric $\Gamma$ is defined as the threshold value for which $\epsilon N_{pix}$ image pixels of $\gamma(r)$ have a value greater than or equal to $\Gamma$.

The factor $\epsilon \in [0; 1]$ is referred to as the saturation ratio and is introduced to improve the robustness of metric r with respect to edges that are not introduced by random media distortions and that do not correspond to edges in the scene of interest, such as the ones created by dysfunctional camera pixels or dust and scratches on the optics of the imaging system for example. Since the occurrence of such defects is relatively low, we typically set c to a small value in the order of $10^{-2}$.

Model for the Fusion Kernel Size

A model is established in order to relate the automated fusion kernel size to the edge metric $\Gamma$ obtained from image analysis. While a linear model could be used, we choose the use the following one:

$$a = K/\Gamma$$

where K is a calibration factor.

Model Calibration

The model for the kernel size is calibrated (i.e. factor K is determined) experimentally as follow. Consider $N_{set}$ experimental data sets each corresponding to a distinct combination of scene of interest and imaging conditions (random-distortion strength, imaging distance, etc.). For each data set, the following two steps are performed: (1) the edge metric $\Gamma$ is computed as shown previously, and (2) image enhancement and image fusion steps previously described are applied to the data set for multiple kernel sizes a within interval [a min;a max] with increments of $\delta a$. The interval can be chosen so that amin corresponds to a sub-pixel size and amax to approximately the size of the image, and increment $\delta a$ is chosen in the order of a pixel size. Among the generated images, a user then selects the frame with best image quality. The $N_{set}$ resulting data points (r,a) are then fit with the curve corresponding to Eq. (7) in order to minimize an error metric, e.g. the root mean square (RMS) error. Curve fitting yields a calibration factor K and the relation is hence complete and provides a practical and automated way to determine parameter a from image analysis.

Although certain preferred embodiments of the present invention have been described, the spirit and scope of the invention is by no means restricted to what is described above. Many combinations of the steps of method described are all within the scope of the present invention.

We claim:

1. A method for mitigating image distortions which comprises:
    enhancing a raw video stream, comprising
        static noise reduction;
        shaking/jitter compensation;
        dynamic noise reduction; and
        contrast enhancement;
    fusing said enhanced video stream using a lucky region fusion technique, comprising
        computing a fusion kernel size;
        determining quality metrics for regions of images in the enhanced video stream;
        determining quality metrics for regions of images of a previously fused video stream;
        computing anisotropic gain which performs a comparison of the image quality metrics for regions of images in the enhanced video stream, and regions of images in the previously fused video stream;
        selecting best image quality regions among the enhanced and the previously fused video stream;
        fusing the selected image regions into a new fused video stream;
        determining global image quality metrics of the new fused video stream;
        comparing the global quality metrics of the images in the new and the previously fused video streams; and
        updating an image in the new fused video stream only when the quality metrics are superior by a predetermined threshold;

iteratively repeating the steps of enhancing and fusing, whereby a stream of fused images is generated;

extracting random media characteristics from said stream of fused images automatically.

2. A method for mitigating image distortions as recited in claim 1 wherein the fusing of the enhanced video stream step is performed by sequentially merging image regions with highest quality within a temporal buffer into a single image.

3. A method for mitigating image distortions as recited in claim 1 wherein the step of generating a stream of fused images is performed by moving the highest quality image from the temporal buffer after it has been fused and then sliding a temporal window forward.

4. A method for mitigating image distortions as recited in claim 1 wherein the step of automated random media extraction is performed by analyzing the stream of fused images and automatically removing random media characteristics including but not limited to atmospheric turbulence.

* * * * *